United States Patent [19]

Menzel

[11] Patent Number: 4,817,396

[45] Date of Patent: Apr. 4, 1989

[54] APPARATUS FOR PRODUCING ICE CREAM, MILK SHAKES OR FROZEN DESSERTS FROM A FLOWABLE FORMULATION

[75] Inventor: Waldemar Menzel, Kulmbach-Burghaig, Fed. Rep. of Germany

[73] Assignee: LUMENGmbH Nahrmittel- und Maschinenfabrik, Kulmach, Fed. Rep. of Germany

[21] Appl. No.: 162,675

[22] Filed: Mar. 1, 1988

[30] Foreign Application Priority Data

Mar. 11, 1987 [DE] Fed. Rep. of Germany ....... 3707779

[51] Int. Cl.⁴ ............................................. A23G 9/20
[52] U.S. Cl. ........................................ 62/306; 62/342; 366/102
[58] Field of Search ................. 62/306, 307, 342, 343; 366/102, 150

[56] References Cited

U.S. PATENT DOCUMENTS

| | | | |
|---|---|---|---|
| 1,993,130 | 3/1935 | Balleu | 62/307 |
| 2,737,024 | 3/1956 | Swenson | 62/342 |
| 2,746,640 | 5/1956 | Swenson | 222/440 |
| 3,018,641 | 1/1962 | Carpigiani | 62/342 |
| 3,183,681 | 5/1965 | Lutz et al. | 62/135 |
| 3,196,627 | 7/1965 | Swenson | 62/342 X |
| 3,290,015 | 12/1966 | Guetschow | 259/9 |
| 3,304,737 | 2/1967 | Stratznski | 62/306 X |
| 3,402,562 | 9/1968 | Menzel | 62/342 X |
| 3,930,535 | 1/1976 | Menzel | 165/27 |
| 4,045,976 | 9/1977 | Mills | 62/342 X |
| 4,680,944 | 7/1987 | Menzel | 62/342 |

FOREIGN PATENT DOCUMENTS

| | | |
|---|---|---|
| 0225989 | 6/1987 | European Pat. Off. . |
| 2165334 | 7/1973 | Fed. Rep. of Germany . |
| 2321848 | 3/1977 | France . |

*Primary Examiner*—William E. Tapolcai
*Attorney, Agent, or Firm*—Browdy and Neimark

[57] ABSTRACT

An apparatus for producing ice-cream from a flowable formulation consists of a storage container for the formulation and a cooling and freezing cylinder disposed beneath this and connected to the container by a feed pipe. An air line discharges into this cylinder, feeding compressed air which is to be whipped into the formulation. In order to prevent foaming in the storage container, a retaining means is associated with the feed pipe which largely seals the feed pipe when pressure obtains in the cylinder and in the storage container, substantially opening the feed pipe when the pressure therein fails.

25 Claims, 3 Drawing Sheets

APPARATUS FOR PRODUCING ICE CREAM, MILK SHAKES OR FROZEN DESSERTS FROM A FLOWABLE FORMULATION

FIELD OF THE INVENTION

The invention relates to an apparatus for producing ice cream, milk shakes or frozen desserts from a flowable formulation and consisting of a gas-tightly closable storage container for the formulation and, connected to it by a feed pipe, a cooling and freezing cylinder in which there is a rotatingly drivable agitating and scraping mechanism, the feed pipe terminating in an inlet chamber disposed at one end of the cylinder, there being at the other end of the cylinder a dicharge valve, means being provided for transporting the formulation from the inlet chamber to the discharge valve, an air line discharging into the inlet chamber in order to apply compressed air to the cylinder and the storage container.

BACKGROUND OF THE INVENTION

An apparatus of the type mentioned before is known from U.S. Pat. No. 3,930,535. In this known apparatus the formulation, which is an ice-mix, flows from a storage container through the feed pipe into the inlet chamber of the cooling and freezing cylinder. There, air forced into the inlet chamber is whipped into the formulation so that the ice-mix/air mixture is frozen and then drawn off through a discharge valve as a portion of ice-cream, particularly as what is known as soft ice. The feed pipe which is formed by a tube of relatively large cross-section discharges laterally into the inlet chamber so that compressed air is present above the space in the outlet orifice of the feed pipe. This permits a control of the supply of the ice-mix from the container to the cylinder. In this known apparatus of the type in question, outside of the actual ice-cream producing process, the ice-mix is heated up in the cooling and freezing cylinder and in the storage container to pasteurisation temperature. It is an experience that ice-mix emerging from the inlet chamber and enriched with air and already partly frozen, rises through the feed pipe into the storage container where it leads to a considerable amount of foaming. This also causes breakdown since the ice-mix which is not yet enriched with air no longer properly flows into the inlet chamber so that when ice portions are drawn off at the discharge valve there is the risk that air flows out through the discharge valve.

It is known that this foaming can be partly countered by an appropriate composition of the formulation (ice-mix) used. Where the composition of the formulation cannot be affected, however, this is not possible.

SUMMARY OF THE INVENTION

Therefore, it is an object of the invention to provide an apparatus of the type mentioned wherein foaming in the storage container is effectively prevented.

According to the invention, there is associated with the feed pipe a retaining means which substantially seals off the feed pipe when there is pressure in the air line and opens it when the pressure in the air line fails. The essential aspect of the invention lies in the fact that the feed pipe can be substantially closed when the storage container and cylinder are under pressure, i.e. during the normal whipping of air into the formulation and during the freezing operation. In this case, the feed pipe is sufficiently closed that on the one hand any already partly frozen ice-mix which may incorporate inclusions of air cannot rise into the storage container, while on the other hand a follow-up supply of ice-mix is not impeded. On the other hand, if the entire apparatus is rendered. pressure-less, which happens for pasteurisation, then the retaining means will be opened so that free circulation or exchange of ice-mix is possible between cylinder and storage container. An advantageous opportunity of substantially closing off the feed pipe is achieved when the retaining means comprises, at least substantially covering the feed pipe, a retaining plate having apertures. Dimensioning of the apertures to have a diameter of 0.5 to 3 mm and particularly of 1 to 1.5 mm has been shown as particularly expedient in achieving trouble-free operation.

The disposition of the retaining plate in an inlet aperture to the feed pipe in the storage container is especially simple from the operating and construction points of view. The basic principle of how a substantial closure or opening of the feed pipe by means of the retaining plate occur consists in that the retaining plate can be raised from the inlet aperture into the storage container and that the retaining plate can be lifted up from or lowered onto the inlet aperture by a linearly acting retaining plate drive.

There is provided a retaining plate drive which does not penetrate the wall of the storage container by a rotary connection and which is also directly operated by the compressed air used to be beaten into the ice-mix.

Further advantages and features of the invention will become apparent from the ensuing description of an examplary embodiment, taken in conjunction with the drawings.

DESCRIPTION OF THE PREFERRED EMBODIMENT

Figure 1:
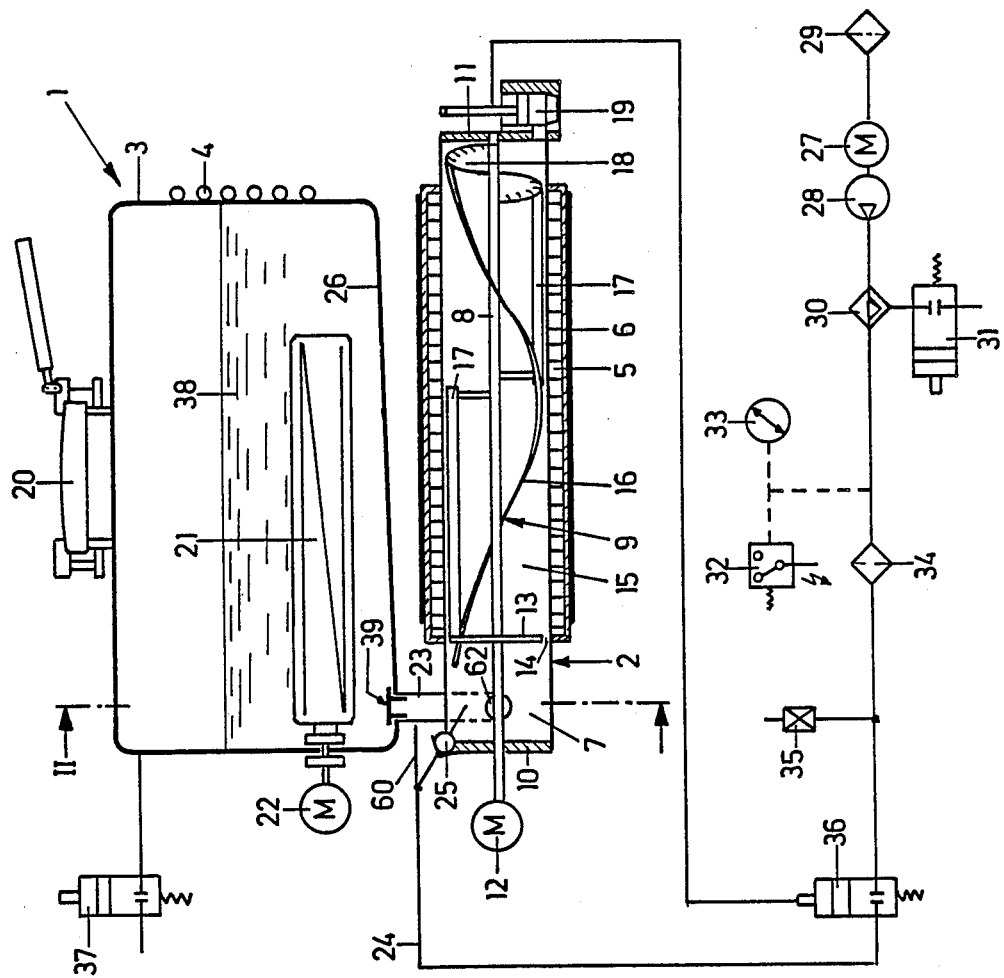
FIG. 1 is a diagrammatic vertical longitudinal section through an apparatus for producing ice-cream.
Figure 2:
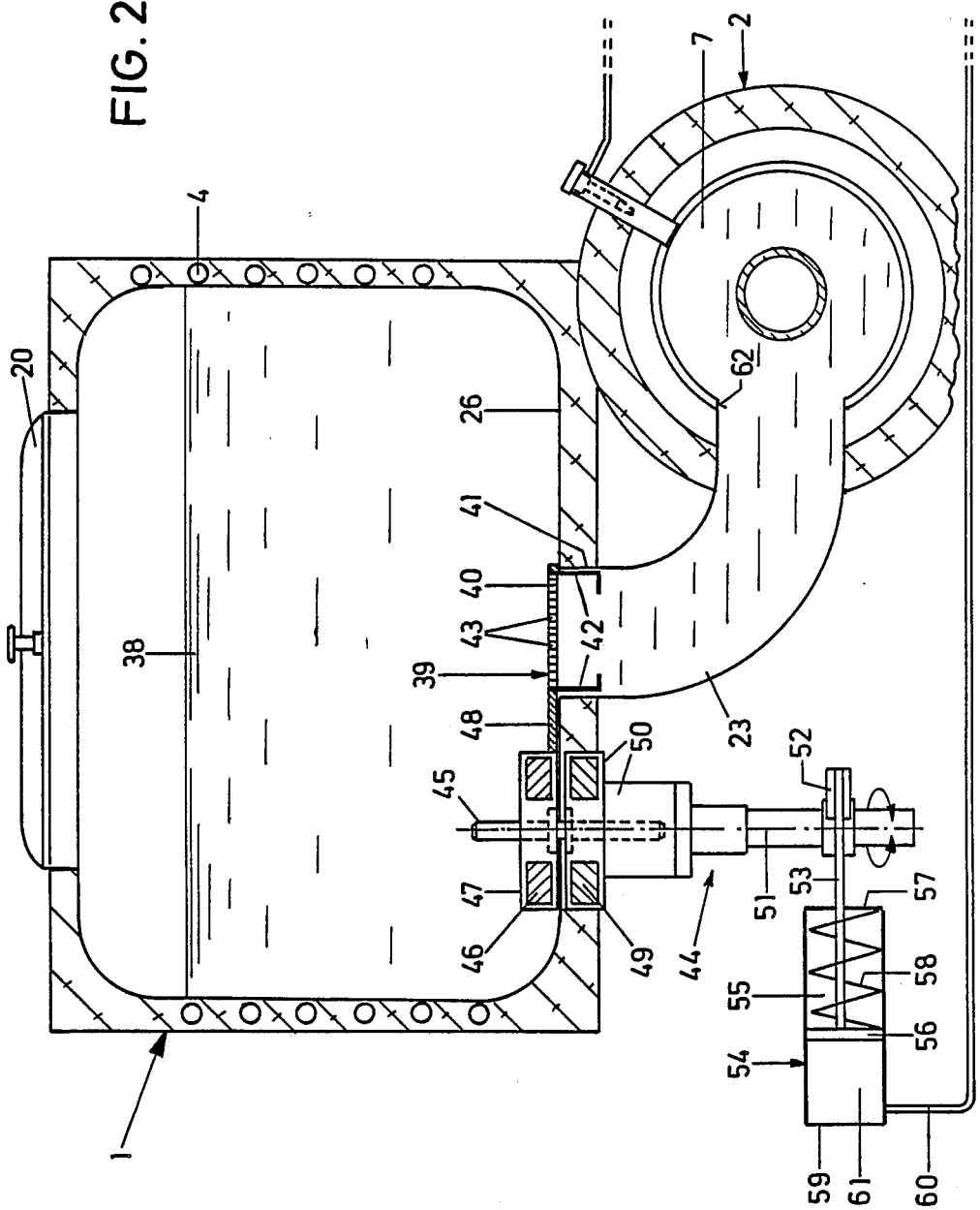
FIG. 2 is a cross-section through an apparatus taken on the line II—II in FIG. 1, with the retaining means closed.

Although FIG. 1 is a diagrammatic view while FIG. 2 is a structural illustration, both drawings employ the same reference numerals to identify identical parts.

As emerges from FIGS. 1 and 2, a storage container 1 is in a generally conventional manner disposed above a horizontal cooling and freezing cylinder 2 forming substantially one unit therewith. The side walls 3 of the storage container 1 are provided with a cooling pipe 4 which extends approximately helically around the side walls 3.

The cylinder 2 is enclosed by a cooling jacket 5 through which a coolant can be pumped. The cooling jacket 5 itself is once again enclosed by a heating jacket 6. Cooling jacket 5 and heating jacket 6 extend substantially over the entire length of the cylinder 2 with the exception of an area disposed at one end, on the left in FIG. 1, in which there is an inlet chamber 7 of the cylinder 2. The cylinder 2 is traversed coaxially by a shaft 8 of an agitating and scraping mechanism 9 rotatably mounted in end walls 10, 11 of the cylinder 2 and emerging from one end, on the left in FIG. 1. The agitating and scraping mechanism 9 is driven at this end by an electric motor 12.

Mounted on the shaft 8 is a disc 13 which leaves only a very narrow gap 14 between it and the wall of the cylinder 2. This disc 13 separates the inlet chamber 7 from the actual cooling and/or freezing chamber 15 in the cylinder 2 which is enclosed by the cooling jacket 5 and the heating jacket 6. In the chamber 15, an agitating spiral 16 is mounted on the shaft 8. Also mounted on the shaft 8 and bearing against the inside wall of the cylinder 2 are scraper blades 17 which constantly scrape the ice formulation off the inside wall of the cylinder 2. Following on from the spiral agitator 16 there is on the shaft 8 also a short-pitch worm 18 having a worm thread which exerts a certain damming effect in relation to the spiral agitator 16. In front of the end wall 11 which is opposite the motor 12 there is a discharge valve 19. An aperture connecting the inlet chamber 7 to the chamber 15 can be provided in the disc 13 which forms an intermediate wall.

The storage container 1 and the cooling and freezing cylinder 2 are pressure-resistant. The storage container 1 is closed by means of a pressure-resistant and airtightly closing cover 20. Disposed in the storage container 1 is a roller-like agitator 21, only shown in FIG. 1, which is adapted to be driven by an electric motor 22.

From the storage container 1, a feed pipe 23 discharges into the inlet chamber 7 of the cylinder 2, this feed pipe 23 consisting of a pipe bend of relatively large cross-section which discharges into the inlet chamber 7 substantially at the height of the shaft 8 of the agitating and scraping mechanism 9. Through this feed pipe 23, compressed air supplied can also rise up into the storage container which is why this latter must be of air-tight and pressure-resistant construction. This air is introduced through an air line 24 into the upper portion of the inlet chamber 7. To prevent liquid and/or air flowing out of the inlet chamber 7 and back into the air line 24, the latter comprises a non-return valve 25 which may, for instance, be a so-called lipped valve. The air line 24 receives compressed air from a compressor 28 driven by an electric motor 27 and upstream of which there is an air filter 29. Downstream of the compressor 28 is a compressed air dehumidifier 30.

Subsequently, there is connected into the air line 24 an drain valve 31 which is constructed as a magnetic valve and by means of which the entire compressed air system can be rendered pressureless. Furthermore, there is in the line 24 a pressure monitor 32 which switches on the compressor 28 when the pressure in the air line 24 falls below a preset minimum. This minimum pressure may, for instance, be around 1.7 bars. The compressor shuts down again when the pressure exceeds a predetermined maximum pressure of, for instance, 2 bars. The air pressure can furthermore be monitored visually by means of a pressure indicating instrument 33. In addition, a compressed air sterile filter 34 and a safety valve 35 may be provided in the air line 24.

Finally, there is also provided in the air line 24 a magnetic valve 36 which is actuated by the discharge valve 19. When the discharge valve 19 is opened, the magnetic valve 36 closes so that no compressed air can be forced into the inlet chamber 7.

Provided in the upper part of the storage container 1 is a drain valve 37 which is constructed in the same way as the drain valve 31, as a magnetic valve, and which serves to render the entire apparatus pressureless when there is a discontinuance of operation, for example for pasteurisation or for refilling with ice-mix 38 poured into the storage container 1.

As is shown only by FIG. 2, there is in the bottom 26 of the storage container 1 an ice-mix retaining means 39. This comprises a retaining plate 40 or damming plate which can be lowered onto or raised off the inlet aperture 41 of the feed pipe 23. The retaining plate 40 has on its under side guide pins 42 by means of which it is guided in the feed pipe 23 while being raised or lowered. This retaining plate 40 has apertures 43 of 1 to 3 mm diameter, the diameter preferably being in the range from 1 to 1.5 mm. For raising and lowering the retaining plate 40, a retaining plate drive 44 is provided. This has a tap 45 traversing the bottom 26 of the storage container 1 in fluid and gas-tight fashion. Inside the storage container 1, on the tap 45, a ring magnet 46 is disposed for free axial displacement, being enclosed by a jacket 47 of non-magnetic material, for example high-alloy refined steel. This ring magnet 46 or its jacket 47 is connected rigidly to the retaining plate 40 by a connecting web 48, so that when the ring magnet 46 on the tap 45 is raised, the retaining plate 40 is lifted off the inlet aperture 41 of the feed pipe 23 while if the ring magnet 46 on the tap 45 is lowered towards the bottom 26 of the storage container 1, the retaining plate 40 is lowered over the inlet aperture 41 so that the storage container 1 is only connected by the apertures 43 in the retaining plate 40 to the feed pipe 23 and thus to the cooling and freezing cylinder.

Outside the storage container, on the tap 45, there is once again a ring magnet 49 identical to the ring magnet 46 and which is pivotable in a housing 50 about the longitudinal central axis 51 of the tap 45 while being, however, non-displaceable in the longitudinal direction of the tap 45. Through a pivot lever 52 extending radially of the axis 51, a piston rod 53 of a pneumatically operable piston-cylinder drive 54 engages the housing 50. In the cylinder 55 of this drive 54 there is a displaceable piston 56 on which the piston rod 53 is fixed by its end opposite the pivot lever 52. Between the piston 56 and that end face 57 of the cylinder 55 through which the piston rod emerges there is a pretensioned screw-type pressure spring as restoring spring 58. In the region of the other end face 59, a branch 60 of the air line 24 discharges into the pressurised spaced 61 of the drive 54 which is formed between the piston 56 and the said end face 59.

Figure 4:
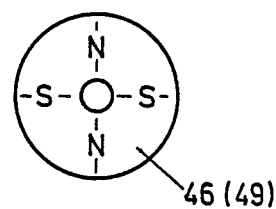
FIG. 4 is a plan view of a ring magnet of the retaining means.

As FIG. 4 shows, the ring magnets 46, 49 are of the 4-pole type, i.e. at intervals of 90° each; they comprise alternately a north pole N or a south pole S.

In the lowered position of the retaining plate 40 as shown in FIG. 2, the north poles N of the ring magnet 49 coincide with the south poles S of the ring magnets 46 and vice versa. The two ring magnets 46, 49 which are permanent magnets, therefore attract each other.

Figure 3:
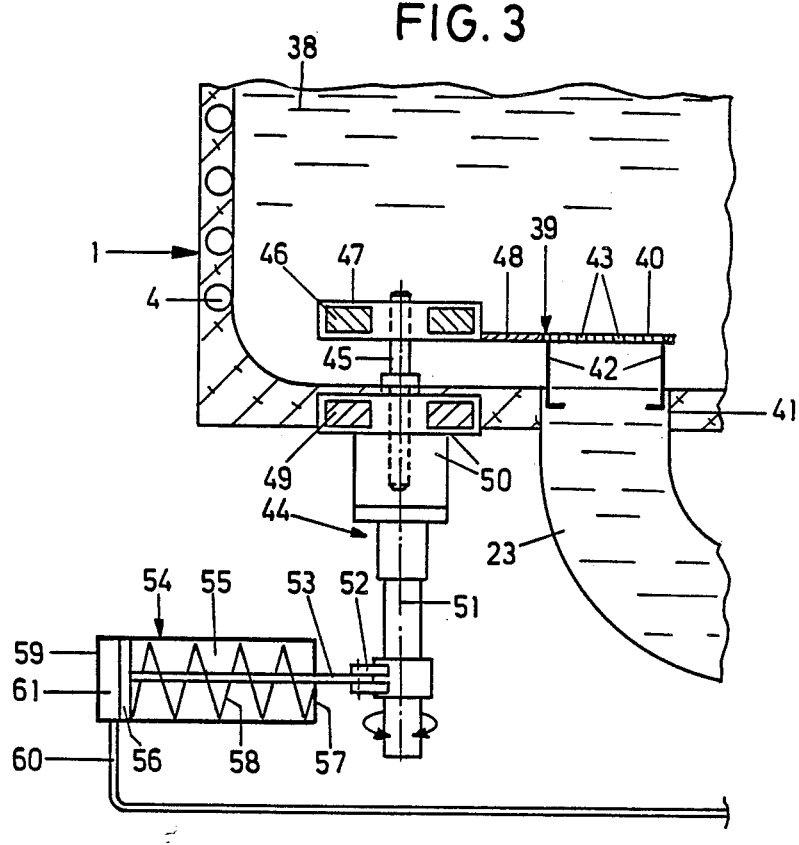
FIG. 3 is a partial detail from FIG. 2 with the retaining means opened.

In the position of the retaining plate 40 shown in FIG. 3, where it is lifted off the inlet aperture 41, the north poles N and the south poles S of the two ring magnets 46 and 49 coincide, so that the ring magnets 46, 47 repel each other with the result that the retaining plate 40 is raised. The guide pins 42 prevent the ring magnet 46 being corotated with the retaining plate 40 if there is a rotation of the ring magnet 49.

The lowered position of the retaining plate 40 occurs when the pressurised space 61 in the cylinder 55 has compressed air supplied to it, in other words when the entire apparatus is pressurised. In this case, by virtue of the gas pressure obtaining in the pressurised space 61, the piston 56 pivots against the force of the restoring spring 58, moving the pivot lever 52 into the position shown in FIG. 2, as has already been explained. When the pressure is relieved, when therefore the automatically controlled compressed air system is shut down and when the air over-pressure is released from the storage container 1 and the cooling and freezing cylinder 2, the restoring spring 58 pushes the piston 56 back and draws the piston rod 53 into the cylinder 55 so that the housing 50 with the ring magnet 49 is pivoted in the position shown in FIG. 3. This pivoting movement occurs about the axis 51 through 90° or according to the angular pitch of the ring magnets 46, 49.

The apparatus works as follows:

During normal operation, the storage container 1 is at least partly filled with ice-mix 38. The inlet chamber 7 is filled to about the outlet orifice 62 of the feed pipe 23, in other words is about two-thirds filled with ice-mix. The inlet chamber 7 is kept at a pressure of about 2 bars by the non-return valve 25. In the cooling and freezing chamber 55 there is ice-mix into which air is beaten and which is at least partially frozen. The retaining plate 40 is lowered onto the inlet aperture 41 of the feed pipe 23. A rising of slightly frozen air-enriched ice-mix through the feed pipe 23 into the storage container 1 is prevented by the retaining plate 40. When portions of ice are drawn off by opening the discharge valve 19, then during this period for which the discharge valve 19 is opened, the magnetic valve 36 closes so that throughout this period no compressed air can flow into the inlet chamber 7. This prevents compressed air escaping directly through the discharge valve 19 and interfering with the delivery of a portion. Since tapping off a portion of ice-cream takes only a short time, the pressure in the pressurised space 61 does not during this time fall so much that the retaining plate 40 is already lifted. Even if this were the case briefly, it would not present a problem.

After one or several portions of ice have been drawn off through the discharge valve 19, ice-mix is supplied from the storage container 1 to the chamber 7. Since compressed air is supplied once again through the non-return valve 25, this compressed air rises through the feed pipe 23 into the storage container 1, so that the pressure in the latter is maintained substantially equal to the pressure in the inlet chamber 7. The further delivery of liquid ice-mix through the apertures 43 in the retaining plate 40 is readily possible. The rising of compressed air into the storage container 1 is likewise readily possible. The rising of air enriched and already slightly frozen ice-mix from the inlet chamber 7 into the storage container 1 is, however, effectively prevented. Although the cylinder 2, in the region of the inlet chamber 7, is not enclosed by either a cooling jacket 5 or a heating jacket 6, the ice-mix also in the inlet chamber is sufficiently cooled by virtue of the passage of heat in the cylinder 2 during normal operation that it is slightly frozen through. During normal freezing, the ice-mix 38 into which air has been beaten is kept to about −7° C. in the cooling and freezing chamber 15. This effect is inevitable if there are prolonged pauses between the drawing of portions from the discharge valve 19.

In order to add further ice-mix to the storage container 1 and in particular for pasteurising the entire ice-mix 38 in the storage container 1 and in the cooling and freezing cylinder 2, the apparatus as a whole is rendered pressureless by opening the drain valves 31 and 37. When this happens, also the drive 54 becomes pressureless so that the retaining plate 40 is moved in the manner described, by the retaining plate drive 44, into the position shown in FIG. 3 in which it is lifted off the inlet aperture 41. During heating and pasteurisation, then, a free exchange of ice-mix 38 between storage container 1 and cooling and freezing cylinder 2 is possible. If—as with the example of embodiment illustrated—heating of the ice-mix 38 occurs only via the heating jacket 6 in the region of the cooling and freezing chamber 15, the possibility of opening and retaining means 39 by lifting the retaining plate 40 is particularly important in order to permit warmth to flow unhindered around the ice-mix 38. But even if, as known, separate heating devices are provided on the one hand on the cylinder 2 and on the other on the storage container 1, the afore-described retaining means 39 is still important so that circulation of ice-mix 38 from the cylinder 2 into the storage container 1 and vice versa through the feed pipe 23 ensures that pasteurisation temperature is also reached therein. In addition, with such a development, the heating at the cylinder 2 always has a greater output than the heating at the storage container 1 since the agitating and scraping mechanism 9 ensures that ice-mix 38 cannot become burned onto the inside wall of the cylinder 2. Such an undesired effect can only be achieved in the storage container 1 when this is heated, if the heating is correspondingly weaker.

If during the description of the example of embodiment, the term ice-mix 38 has been used instead of the term formulation, then this nevertheless means that other formulations can be used, for example for milk shakes or frozen desserts. Also milk shakes have an air inclusion of about 80% in relation to the initial volume of formulation for the milk shake. In the case of frozen desserts, the air inclusion is often higher.

What is claimed is:

1. An apparatus for producing ice cream, milk shakes or frozen desserts from a flowable formulation, comprising a gastightly closable storage container for the formulation;
    a cooling and freezing cylinder connected to the container by a feed pipe in which there is a rotatingly drivable agitating and scraping mechanism, the feed pipe terminating in an inlet chamber disposed at one end of the cylinder, there being at the other end of the cylinder a discharge valve;
    means being provided for transporting the formulation from the inlet chamber to the discharge valve;
    an air line discharging into the inlet chamber in order to apply compressed air to the cylinder and the storage container; and
    a retaining means is associated with the feed pipe which substantially seals off the feed pipe when there is pressure in the air line and opens it when the pressure in the air line fails, wherein the retaining means comprises a retaining plate at least substantially covering the feed pipe and having apertures.

2. The apparatus according to claim 1, wherein the apertures have a diameter of 0.5 to 3 mm.

3. The apparatus according to claim 2, wherein the apertures have a diameter of 1 to 1.5 mm.

4. The apparatus according to claim 1, wherein the retaining plate is disposed in an inlet aperture to the feed pipe in the storage container.

5. The apparatus according to claim 4, wherein the retaining plate can be raised from the inlet aperture into the storage container.

6. The apparatus according to claim 5, wherein the retaining plate can be lifted up from or lowered onto the inlet aperture by a linearly acting retaining plate drive.

7. The apparatus according to claim 6, wherein a permanent magnet disposed in the storage container is provided on the retaining plate and wherein there is associated with it, outside the storage container, a permanent magnet which, by varying its position, repels or attracts the permanent magnet which is present in the storage container.

8. The apparatus according to claim 7, wherein a multi-pole ring magnet is provided on the retaining plate which has a central axis and which is non-rotatable but displaceable together with the retaining plate in the direction of its central axis and wherein a ring magnet is provided outside the storage container having a central axis identical with the central axis of the multi-pole ring magnet and being rotatable about the common central axis but non-displaceable in the longitudinal direction thereof.

9. The apparatus according to claim 8, wherein the retaining plate is displaceable relative to the feed pipe only in the longitudinal direction of the latter.

10. The apparatus according to claim 8, wherein the retaining plate drive is a piston-cylinder drive, with a first side of the piston connected to the air line and a second side of the piston subject to an action of a restoring spring.

11. The apparatus according to claim 10, wherein the piston of the piston-cylinder drive has a piston rod, which is coupled via a pivot lever to the ring magnet disposed outside the storage container.

12. The apparatus according to claim 8, wherein the ring magnets are 4-pole magnets.

13. An apparatus for producing ice cream, milk shakes or frozen desserts from a flowable formulation comprising;
 a gas-tightly closable storage container for the formulation;
 a cooling and freezing cylinder connected to the container by a feed pipe, the cylinder including a rotatingly drivable agitating and scraping mechanism, the feed pipe terminating in an inlet chamber disposed at one end of the cylinder; there being a discharge valve at the other end of the cylinder;
 means for transporting the formulation from the inlet chamber to the discharge valve;
 an air line discharging into the inlet chamber in order to apply compressed air to the cylinder and the storage container which air line is separate from the feed pipe;
 a retaining means associated with the feed pipe which substantially but not completely seals off the feed pipe to prevent rising of partly frozen formulation incorporating air from the cylinder to the storage container and impeding a supply of formulation from the storage container to the cylinder when there is pressure in the air line and which opens the feed pipe when the pressure in the air line fails; and
 means for operating said retaining means responsive to existence or failing of pressure in the air line.

14. The apparatus according to claim 13, wherein the retaining means comprises, at least substantially covering the feed pipe, a retaining plate having apertures.

15. The apparatus according to the claim 14, wherein the apertures have a diameter of 0.5 to 3 mm.

16. The apparatus according to claim 15, wherein the apertures have a diameter of 1 to 1.5 mm.

17. The apparatus according to claim 13, wherein the retaining plate is disposed in an inlet aperture to the feed pipe in the storage container.

18. The apparatus according to claim 17, wherein the retaining plate can be raised from the inlet aperture into the storage container.

19. The apparatus according to claim 18, wherein the retaining plate can be lifted up from or lowered onto the inlet aperture by a linearly acting retaining plate drive.

20. The apparatus according to claim 19, wherein a permanent magnet disposed in the storage container is provided on the retaining plate and wherein there is associated with it, outside the storage container, a permanent magnet which, by varying its position, repels or attracts the permanent magnet which is present in the storage container.

21. The apparatus according to claim 20, wherein a multi-pole ring magnet is provided on the retaining plate which has a central axis and which is non-rotatable but displaceable together with the retaining plate in the direction of its central axis and wherein a ring magnet is provided outside the storage container having a central axis identical with the central axis of the mulipole ring magnet and being rotatable about the common central axis but non-displaceable in the longitudinal direction thereof.

22. The apparatus according to claim 21, wherein the retaining plate is displaceable relative to the feed pipe only in the longitudinal direction of the latter.

23. The apparatus according to claim 21, wherein the retaining plate drive is a piston-cylinder drive, with a first side of the piston connected to the air line and a second side of the piston subject to an action of a restoring spring.

24. The apparatus according to claim 23, wherein the piston of the piston-cylinder drive has a piston rod, which is coupled via a pivot lever to the ring magnet disposed outside the storage container.

25. The apparatus according to claim 21, wherein the ring magnets are 4-pole magnets.

* * * * *